Oct. 8, 1968    R. L. SAINT-DENIS    3,404,428
APPARATUS FOR COMPACTING SAUSAGE CASINGS
Filed April 10, 1967    4 Sheets-Sheet 1

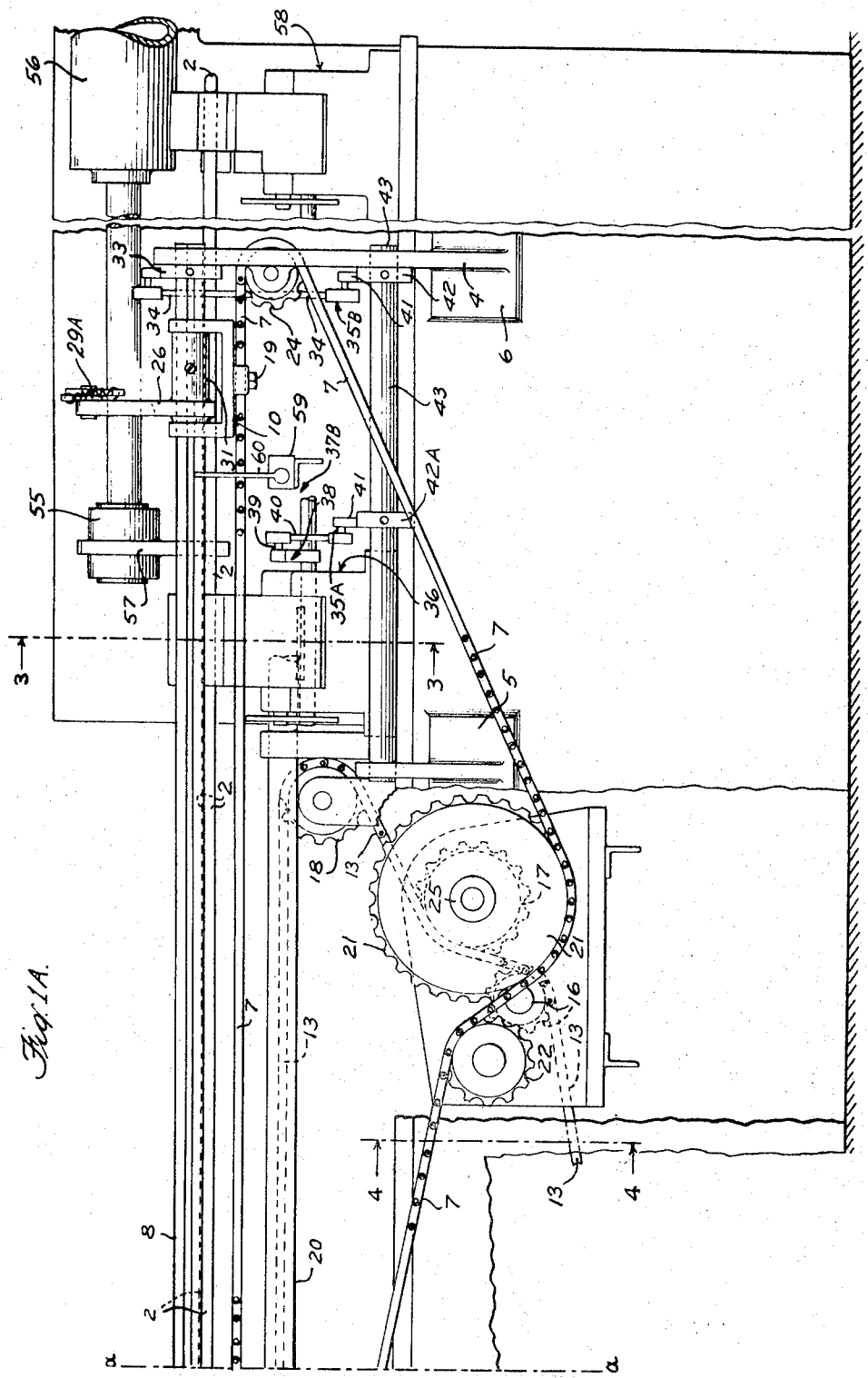

Oct. 8, 1968  R. L. SAINT-DENIS  3,404,428
APPARATUS FOR COMPACTING SAUSAGE CASINGS
Filed April 10, 1967  4 Sheets-Sheet 3

United States Patent Office 3,404,428
Patented Oct. 8, 1968

3,404,428
APPARATUS FOR COMPACTING
SAUSAGE CASINGS
René Lucien Saint-Denis, 6 Rue Paul Baudry,
Paris 8eme, France
Continuation-in-part of application Ser. No. 452,482,
May 3, 1965. This application Apr. 10, 1967, Ser.
No. 629,747
Claims priority, application France, May 5, 1964,
973,384
11 Claims. (Cl. 17—42)

ABSTRACT OF THE DISCLOSURE

An apparatus for shirring and compacting sausage casing tubes which comprises (1) a mandrel adapted to receiving the tubes; (2) shirring means positioned for shirring the tube on said mandrel to form a casing stick; (3) means for severing a predetermined length of said stick; (4) means for advancing the severed link of stick along said mandrel to a compacting station; (5) means at said compacting station for compacting said stick axially to a predetermined shorter length, the means for severing the predetermined length of the stick and the means for advancing the severed length of the stick comprising a pair of carriages disposed at opposite ends of the said mandrel; (6) means for causing each of the carriages simultaneously to be advanced toward center of the mandrel, and (7) springs means for returning each of the carriages to their original position.

---

This invention relates, generally, to an apparatus for treating sausage casings, and, more particularly relates to an apparatus for automatically compacting a casing composed of natural or synthetic material into a form that is suitable for packaging.

This application is a continuation-in-part of application Ser. No. 452,482, filed May 3, 1965, now abandoned.

It is customary to shirr and to compact sausage casings in order to bring them into a compact form suitable for packaging and shipment for use on standard filling machines. The shirring generally consists of axial compression by which a long casing becomes firm and rigid, said casing is then further compressed to form a hollow stick of a standard length which is placed on the rod of the funnel in the filling machine. In the filling operation, the stick is filled at the end, tied to close it, and is then gradually unfolded for the filling of the casing which then resumes its original shape.

In the prior art, various types of machines have provided for shaping and compacting casings, the casings are inflated by air and are repeatedly moved in an axial direction by successive mating groups of lateral teeth while the casing end is retained by a stop.

When a given length of casing, for example, 20 to 30 meters is shirred to form a hollow stick, it is then transferred axially on a compression (shirring) rod for a final length reduction, after which the stick is ready for packing in a carton for shipment to a sausage factory.

The present invention relates to an improved apparatus for shirring and compacting sausage casings, such as that described, for example, in Matecki Patent 2,983,949. It is clearly evident to the workers in this field that machines of the Matecki type are usually quite long and require considerable work on the part of the operator. Therefore, the present invention provides a machine for shirring and compacting casings which permits the worker assigned to the machine to remain at the point of output, and the only necessary operation is the removal of the sticks of shirred and compressed casings from the compression rod and finally placing the sticks in packing cartons.

Thus, the present invention provides for a simple additional, automatic device having a means for securing a desired length of shirred casing, providing as well, internal lubrication and axial transfer of the hollow stick of shirred casing to the compression rod and finally, compression of the same. The subject invention is particularly applicable to a casing machine of the type illustrated in Matecki Patent 2,983,949, which patent clearly shows and describes a machine for shirring a tubular casing to form a compact casing stick of the type described. However, it is clearly obvious that the subject invention may be applied to various other types of machines which are adapted to produce similar type sticks.

Additionally, the present invention provides a means for finally compressing such a stick to a state which is suitable for packaging, or use without further processing.

In one embodiment of the present invention, the device includes a holdback resiliently mounted on a first carriage which is advanced along the mandrel to engage and restrain the shirred casing as it comes from the shirring head and is advanced by an endless chain and sprocket. The chain also passes over a sprocket that tension loads the coil spring means during the holdback's advance, while at the same time a second carriage is similarly advanced toward said first carriage. When a stick of predetermined length has been shirred, shirring stops. Shearing means cut the shirred casing adjacent the shirring head, the tranfer jaws engage the mandrel after the severing means concurrently as the holdback is disengaged therefrom, and the coil spring is released to abruptly reverse the motion of the carriages, thereby separating the shirred stick and pushing it along the mandrel to the compacting zone. After the compacting operation, the casing is manually doffed from the mandrel.

The nature of the invention will be better understood from the following description taken in connection with the accompanying drawings wherein a specific embodiment has been set forth for purposes of illustration.

In the drawings:

FIG. 1 and 1–A, when joined along the line a—a, show side elevation of a machine embodying the present invention;

Figure 1:
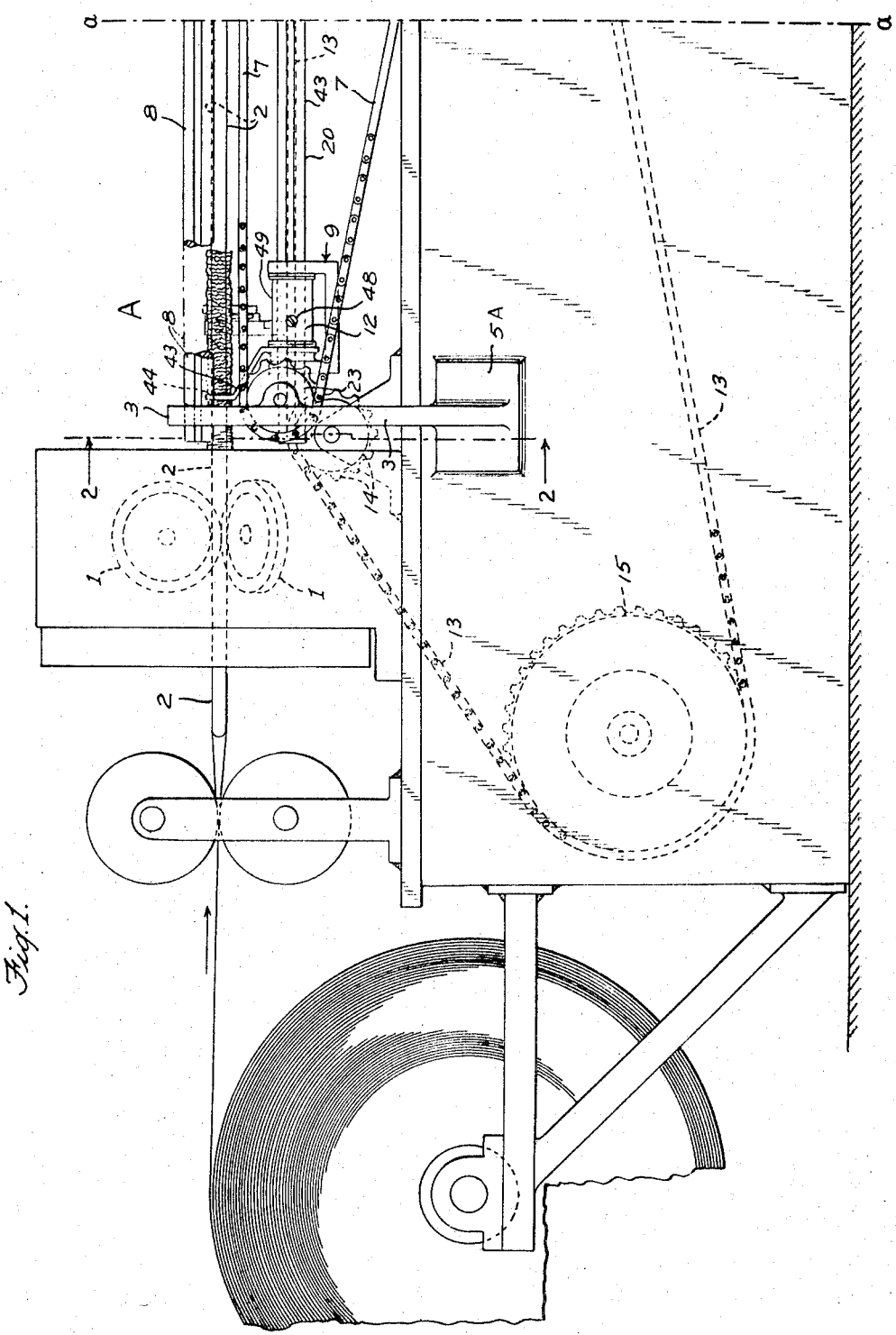

Referring now to FIG. 1, a set of three gear wheels 1 (third wheel not shown) shirrs an inflated casing and moves it from left to right. The shirred casing is pushed along the hollow rod tube wherein the device, according to the present invention, is placed parallel to hollow rod 2 and the necessary elements are set up between the two supports 3 and 4; said supports are fixed by junction plates 5, and 6 on the structure on a standard casing machine, for example, as that illustrated in Matecki 2,983,949.

Figure 4:
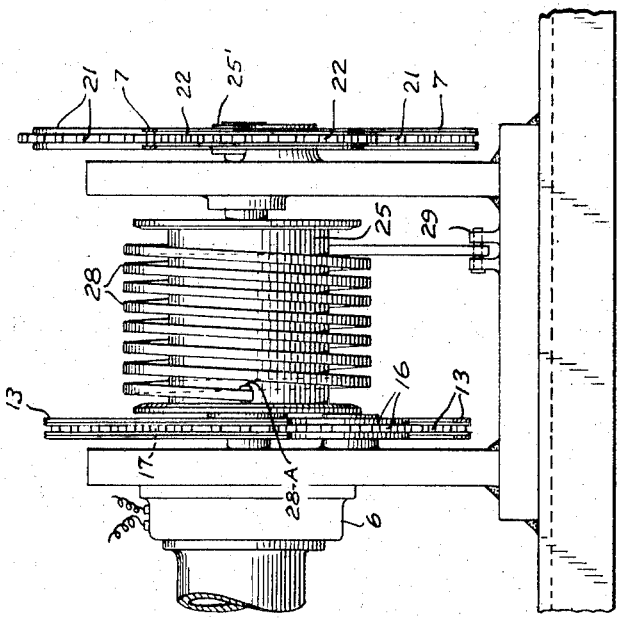
FIG. 4 is a section taken on the line 4—4 of FIG. 1–A, showing a transfer mechanism and its spring return.

Two parallel bars extend toward the two supports 3 and 4. A first bar 20 carries a stirrup carriage 9 and a second bar 8 carries a stirrup carriage 10. Carriage 9 is connected by a bolt 11 to an endless chain 13. A pin 44 on hub 12 is connected with the carriage which will be described in greater detail below in connection with FIG. 2. The endless chain 13 passes over the several sprocket wheels 14, 15, 16, 17 and 18. One of the sprocket wheels is provided with a spring return in order to keep the endless chain 13 properly tensioned (as shown in FIG. 4, which will hereinafter be described). It will be noted, however, that the precise means of spring tensioning the endless chain 13 and the carriage 10 does not go to the essence of the present invention, and any conventional means of spring biasing will suffice for this purpose and therefore no specific embodiment has been selected for complete illustration.

The carriage 10 is connected by a bolt 19 to a second endless chain 7 which passes over sprockets 21, 22, 23 and 24. The tension assembly (FIG. 4) is also used for the spring return of the carriage 10. The sprockets 17 and 21 are connected by a common hub 25. Additionally, the carriage 10 serves as support for an arm 26. The two endless chains 7 and 13 move in opposite directions and with the rotation of the hub 25, the sprockets 17 and 21 turn in the same direction but the chains move in opposite directions. A strong spiral spring 28 is fastened at one end 28–A to the hub 25, while the other end of the spring is joined to a fixed part 29; see FIGURE 4.

Figure 3:
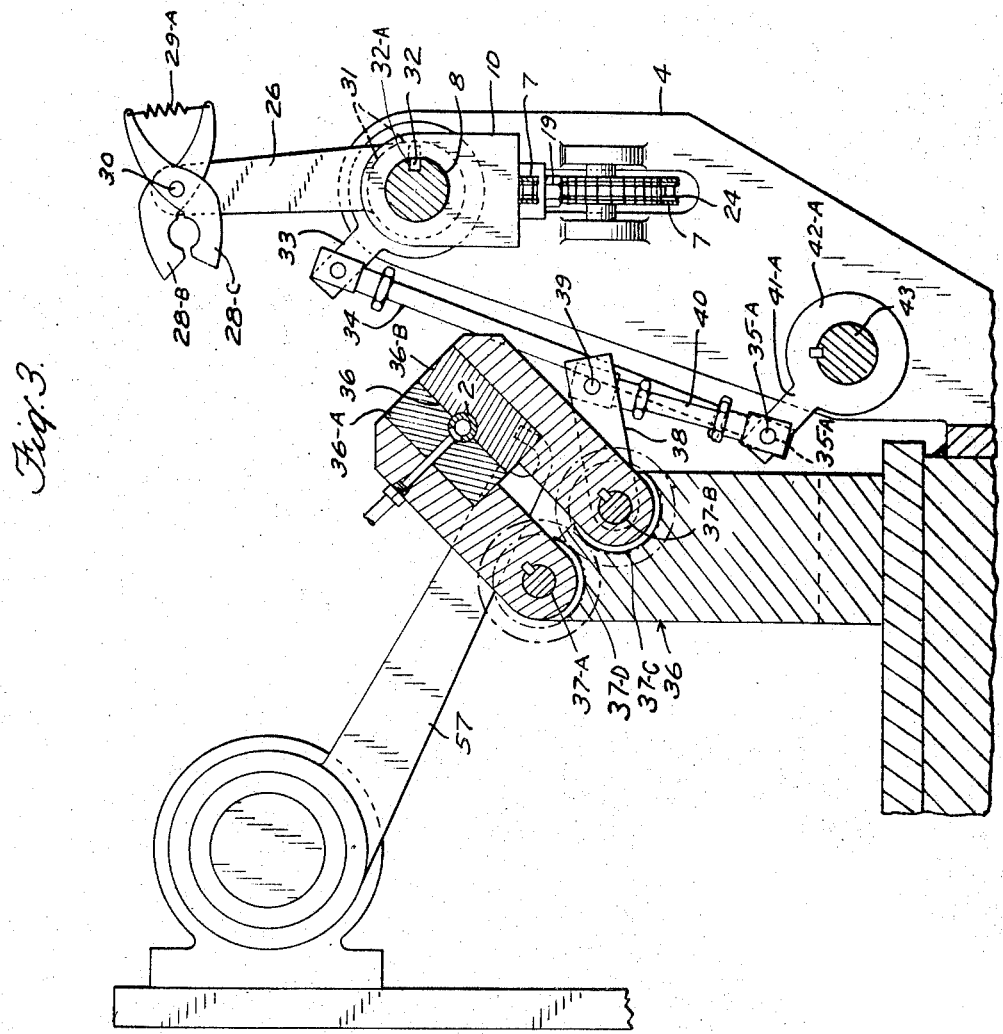
FIG. 3 is a transverse section taken on the line 3—3 of FIG. 1–A, illustrating the details of the compression station.

The arm 26 carries two pincer jaws 28–B and 28–C (note FIGURE 3) with the jaws spread by spring 29–A. These two jaws are movable on pivot pin 30. Arm 26 is attached to a ring, or sleeve, 31 inside of which is a key 32 which is slideable in a longitudinal slot 32–A in bar 8. Arm 26 is rigidly connected to a second arm 33 which is connected with a traction rod 34 (FIG. 3), the other end of which rod is pivoted at 35–B (FIG. 3). A jaw gripper 36 is provided of standard construction and its function is to inject at the left, near wheel 1, an aerosol of oil via apertures in hollow rod 2 into a casing for internal lubrication of the inflated casing to be shirred. The aerosol is discharged up the line via rod 2. An upper jaw 36–A is mounted on a shaft 37–A while a lower jaw 36–B is mounted on a shaft 37–B. The shafts 37–A and 37–B are operatively connected to members 37–C and 37–D for operation in unison. The shaft 37–B is rigidly connected to a member 38 which in turn is pivoted at 39 to a traction rod 40, said rod 40 connected by a pin 35–A to an arm 41–A on head 42–A which is keyed to shaft 43 driven by the rotation of shaft 37–B for the opening and closing of the jaws of the gripper 36.

Figure 2:
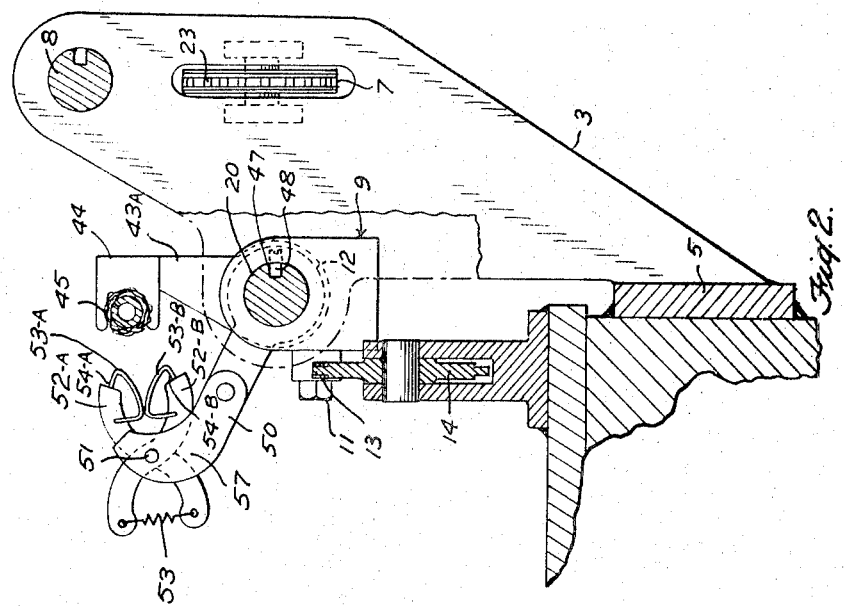
FIG. 2 is a transverse section taken on the line of 2—2 of FIG. 1, showing the severing mechanism.

The shearing mechanism of FIGURE 2 includes a fixed support 43–A provided with a plate 44–A which has a semicircular groove 45 therein in which the shirred casing is centered. This fixed support 43–A has disposed therebelow a hub 12 provided on the inner surface with a key 48 interacting with the longitudinal groove 47 of the bar 20 contained within said hub. An arm 50 is connected to the hub 12 and said arm 50 has at its end a pivot pin 51 for the two movable jaws 52–A and 52–B spread at the ends by a biasing spring 53 (actually a compression spring which tends to approach 52–A and 52–B). The tips of the jaws are equipped with two small spring wires 53–A, extending inwardly as indicated at 54–A and a spring wire 53–B extending inwardly as indicated at 54–B. Upon rotation of the rod 20, these springs sever the shirred casings between them.

Referring now to FIGURE 1–A, 55 denotes a cam on the rod of a jack 56 said cam having a compression arm 57. The shirring machine is equipped with a second jaw gripper 58 like the jaw gripper 36, which is disposed on the right end of rod 2.

When carriage 9 is in position A, as shown in FIGURE 1 and engaged on compression rod 2 with grippers 36 and 58 closed, carriage 10 is disposed in a return position and the compression arm 57 is engaged on the shirring bar 2. The compression arm 57 then returns to the left and means, not shown, open gripper 58 in the manner described for gripper 36. Carriage 9 then moves rightwardly toward gripper 36 and carriage 10 is simultaneously directed leftwardly toward position A.

When carriage 10 arrives in position A, extreme left carriage 9 stops, gripper 58 closes (by conventional means, e.g., electrically controlled switch), thus having previously made it possible for the worker to remove the product casing, gripper 36 opens by a cam (not shown) and thereby causes shaft 37–B to pivot, causing the rotation of bar 20 carrying carriage 9 and the severing means by a cam as well as that of bar 8 carrying carriage 10 by means of the shaft 43. The rotation of bar 20 causes the small springs 53–A and 53–B to close in on the casings while on the stick whereby the shirred casing is sheared.

The rotation of bar 8 causes jaws 28–B and 28–C of arm 26 to be engaged on shirring rod 2 to the right of the cutting device (bars 20 and 8 are simultaneously rotated).

The transfer of the casing is initiated by the movement of carriage 9 to the right, and the simultaneous movement of carriage 10 to the left. At the ends of their strokes of travel the drive means for the carriages are released automatically and the final transfer of the casing is caused by rapid return of the carriage 10 toward the right of the device, and return of carriage 9 to the left because of their spring loading. At the end of this movement, arm 26 acts on the stop 59 which operates lever 62 and causes compression arm 57 to engage the shirring rod by known means not shown. Gripper 36 closes, and the jaws 28–B and 28–C are then released and a new cycle can start.

While a particular embodiment of the present invention has been illustrated by way of specific example, it is to be understood that the present invention is in no way to be deemed as limited thereto but should be construed as broadly as any or all equivalents thereof.

What is claimed is:

1. In an apparatus for shirring and compacting sausage casing tubes the improvement which comprises a mandrel adapted to receive said tube, shirring means positioned to shir the tube on said mandrel to form a casing stick, means severing a predetermined length of said stick, means advancing the severed length of stick along said mandrel to a compacting station, and means at said compacting station for compacting said stick axially to a pre-determined shorter length wherein the means for advancing and severing said stick comprise a pair of carriages disposed normally at the opposite ends of said mandrel, means advancing each of said carriages toward the center of said mandrel, and spring means retracting each of said carriages to its original position.

2. Apparatus as set forth in claim 1 wherein the paths of said carriages overlap at the center of said mandrel whereby the casing stick is first advanced by one of said carriages to a central position and is then advanced by the other of said carriages to a final position at said compacting station.

3. Apparatus as set forth in claim 1 in which said carriages are driven by power means including endless chains.

4. Apparatus as set forth in claim 2 in which releasable clamping means is provided for said mandrel at a central position between said shirring station and said compacting station to permit the casing stick to be shifted therethrough from shirring position to compacting position.

5. Apparatus as set forth in claim 4 in which a second clamping means is provided to cause said central gripping means to grip a mandrel and a second gripping means to release said mandrel to permit withdrawal of the compacted casing stick therethrough.

6. Apparatus as set forth in claim 4 including means associated with said central clamping means for injecting a lubricating fluid into said casing.

7. In an apparatus for shirring tubular cellulosic casing and compacting it comprising a mandrel bar onto which said tubular casing it fed, shirring means disposed adjacent the front end of said mandrel bar for shirring said casing to provide a casing stick, casing severing means disposed rearwardly of said shirring means to cut a predetermined length of the shirred casing, advancing means for moving said cut length of casing toward the rear of said mandrel bar to a compacting station, and compressing means adjacent said compacting station to compress said length of casing into a shorter length wherein said advancing means includes a carriage, and an endless chain sprocket means for drawing said carriage.

8. The apparatus of claim 7 wherein spring means are operatively connected to said carriage to return it to its initial starting position.

9. The apparatus of claim 8 wherein said severing means includes pincer jaws with a spring member for each jaw.

10. The apparatus of claim 9 wherein releasable clamping means are provided between said shirring station and compacting station for releasably gripping said length of casing.

11. The apparatus of claim 10 wherein lubricating fluid means are operatively connected to said clamping means for injecting a lubricating fluid into said casing.

References Cited
UNITED STATES PATENTS

| | | | |
|---|---|---|---|
| 2,983,949 | 5/1961 | Matecki | 17—42 |
| 3,110,058 | 11/1963 | Marbach | 17—42 |
| 3,112,517 | 12/1963 | Ives | 17—42 |
| 3,315,300 | 4/1967 | Ziolko | 17—42 |

LUCIE H. LAUDENSLAGER, *Primary Examiner.*